United States Patent Office 2,856,567
Patented Oct. 14, 1958

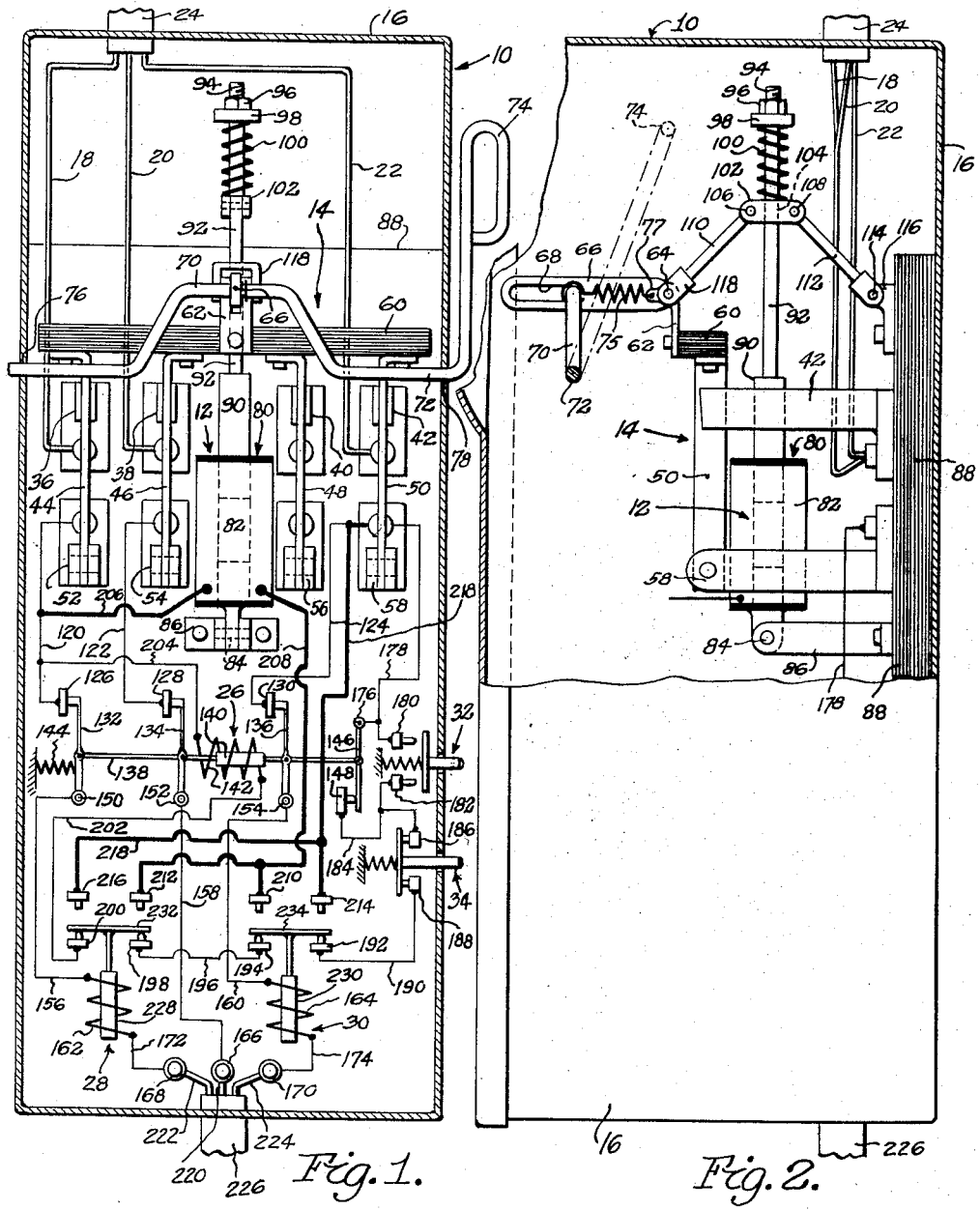

2,856,567

PROTECTIVE DEVICE FOR ELECTRIC CIRCUIT SWITCHING APPARATUS

Arthur J. Browning, Monroe, Mich.

Application August 17, 1953, Serial No. 374,681

7 Claims. (Cl. 317—60)

This invention relates to electric circuit switching apparatus and, in particular, to protective devices for protecting such circuits and the electrical equipment controlled thereby from damage in the event of an overload developing therein.

One object of this invention is to provide a protective device for an electric circuit switching apparatus, such as an electric motor control switching apparatus, which will automatically shift the line switch thereof to its inoperative position, in the event an overload develops and the usual protective devices fail to function, thereby preventing the motor from single phasing.

Another object is to provide an overload protecting device of the foregoing character wherein the device automatically shifts the line switch bodily in the event that the contacts of the overload contactor switch stick together or otherwise fail to separate, even though the overload relay has operated to de-energize the operating coil of said contactor switch.

Other objects and advantages of the invention will become apparent during the course of the following description of the accompanying drawings, wherein:

Figure 1 is a diagrammatic view of an overload protective device, applied to an electric motor control switching apparatus equipped with a thermal overload cutout circuit according to one form of the invention, with the line switch closed and with the protective device of the present invention in its inoperative position; and Figure 2 is a fragmentary side elevation of the protective device shown in Figure 1, partly in section along the line 2—2 in Figure 1.

Hitherto, electric circuit control switching apparatus such as for electric motor control circuits or the like has been equipped with a contactor switch having one or more thermal overload relays in circuit with the operating coil of the contactor switch. The intention has been that if an overload develops in the output circuit, such as in the motor circuit, the consequent thermal effect of the overload actuates the thermal relay to open the relay contacts thereof, thereby de-energizing the operating coil of the contactor switch so that the spring which urges its contacts apart would normally separate these contacts. The line switch, however, in such devices remains closed from having been closed manually by the operator, and if the contactor switch contacts accidentally stick together or otherwise fail to separate under the urge of the spring which is supposed to separate them, the electric current from the line circuit continues to flow through the output circuit, damaging or burning out the motor or other electrical equipment controlled thereby, notwithstanding the satisfactory operation of the thermal overload relay itself.

The present invention prevents such damage by forcibly opening the line switch in the event of the development of such an overload, even though the contacts of the contactor switch happen to stick together or otherwise fail to separate in response to the operation of the thermal relay and the consequent de-energization of the contactor switch operating coil. The invention includes a solenoid-operated line switch shifter having the solenoid winding connected in series between the line circuit and an additional set of contacts on the normally "off" side of the thermal relay, thus causing the relay to energize the solenoid winding to shift the solenoid armature, setting in motion the mechanism which forcibly opens the line switch and de-energizes the entire circuit.

Referring to the drawings in detail, Figure 1 shows an electric circuit switching apparatus, generally designated 10, equipped with the protective device, generally designated 12, according to one form of the invention. The protective device 12 is applied to the usual line switch 14 contained within the housing 16 and having the supply current lines 18, 20 and 22 leading thereto from a conduit 24 and connected to a source of electricity. The apparatus 10 also includes a contactor switch, generally designated 26, a pair of thermal overload relays, generally designated 28 and 30 respectively, and start and stop push button switches, generally designated 32 and 34 respectively. The usual wiring of such switching apparatus is shown in light lines in Figure 1, whereas the wiring for the protective device of the present invention is shown as a four-blade or four-pole switch, simply to give a balanced effect in shifting, three blades and a three-pole switch being sufficient for the electrical requirements of a three-wire circuit. The supply lines 18, 20 and 22 are connected to the knife contacts 36, 38 and 42 of the line switch 14, the knife contact 40 being unconnected because not in use. Switch blades 44, 46, 48 and 50 engage the knife contacts 36, 38, 40 and 42 respectively and are pivoted to blade contacts 52, 54, 56 and 58 respectively. The switch blades 44, 46, 48 and 50 are secured and interconnected by the usual insulated cross bar 60, to which an angle bracket 62 is secured. Pivotally connected as at 64 to the angle bracket 62 is a swinging slotted link 66 having an elongated slot 68 in which the offset or crank portion 70 of a manual operating crankshaft 72 swings to and fro in response to the swinging of a handle 74 on one end of the crankshaft 72 and outside the housing 16. A tension spring 75 connects the crank portion 70 with a lug 77 on the angle bracket 62. The crankshaft 72 is journaled in and extends outwardly through holes 76 and 78 in the opposite sides of the housing 16. Consequently, the swinging of the handle 74 swings the crank portion 70 of the crankshaft 72 to exert a pull on the spring 75 and consequently to swing the switch blades 44 to 50 inclusive upward or downward out of or into engagement with their respective knife contacts 36 to 42 inclusive.

The protective device 12 for automatically shifting the line switch 14 into its open circuit position upon the development of an overload in the output circuit thereof consists of a solenoid, generally designated 80, having a winding 82 which is pivoted at 84 to a bracket 86 bolted to the line switch base 88 and an armature 90 reciprocable into and out of the winding 82. Connected to the armature 90 is a rod 92 having a threaded outer end 94 carrying an adjusting nut 96 and abutment washer 98 for a compression coil spring 100, the opposite end of which engages a cross head 102 having a hole 104 through which the rod 92 loosely and reciprocably passes. Pivoted as at 106 and 108 to opposite ends of the cross head 100 are toggle links 110 and 112 respectively. The opposite end of the toggle link 112 is pivoted as at 114 to a bracket 116 bolted to the switch base 88. The opposite end of the toggle link 110, on the other hand, carries a clevis 118 which is pivoted to the pivot pin 64 carried by the bracket 62 and to which the slotted link 68 is also pivoted. Thus, when the winding 82 of the solenoid 80 is energized, the consequent pull inward upon the armature 90 and shaft 92 tends to straighten out the toggle links 110 and 112, thereby swinging the switch blades 44 to 50 inclusive out of engagement with their knife contacts 36 to 42 inclusive.

The blade contacts 52, 54 and 58 are connected by the lines 120, 122 and 124 to the fixed contacts 126, 128 and 130 of the overload contactor switch 26, these being engaged by the movable contact arms 132, 134 and 136 respectively. The arm contacts 132, 134 and 136 are shifted bodily and simultaneously by a rod 138 pivoted thereto and carrying the armature 140 mounted within an operating coil 142. The rod 138 and armature 140 are urged in one direction by a compression coil spring 144 and in the opposite direction by the armature 140 when the operating coil 142 of the contactor switch 26 is energized. Also pivotally connected to the rod 138 is a holding switch arm 146 having a fixed contact 148 for establishing a holding circuit through the operating coil 142 upon the energization thereof, as described below in connection with the operation.

Running from the arm contacts 150 and 154 of the contactor switch arms 132 and 136 are lines 156 and 160, which in turn are connected to one end of each of the resistance heating coils 162 and 164 which constitute the operating coils of the conventional thermal overload relays 28 and 30 respectively. From the arm contact 152, the line 158 runs to the output terminal 166 of the switching apparatus 10, the other output terminals 168 and 170 thereof being connected by lines 172 and 174 respectively to the opposite ends of the relay operating coils 162 and 164 respectively. The arm contact 176 of the holding switch arm 146 of the contactor switch 26 is connected to a line 178 which runs from the blade contact 58 of the line switch 14 to a contact 180 of the start switch 82, the opposite contact 182 of which is connected by the line 184 to the fixed contact 148 of the holding switch arm 146.

The start switch 32 is resiliently urged to a normally open position out of engagement with its fixed contacts 180 and 182. The stop switch 34, on the other hand, is resiliently urged to a normally closed position in engagement with its fixed contacts 186 and 188 respectively. The fixed contact 186 of the start switch 34 is connected to the line 184 interconnecting the contacts 182 and 148, whereas the fixed contact 188 of the stop switch 34 is connected by the line 190 to one of the fixed lower contacts 192 of the thermal overload relay 30. The opposite fixed lower contact 194 thereof is connected by the line 196 to the lower fixed contact 198 of the thermal overload relay 28, the remaining fixed lower contact 200 of which is connected by the line 202 to one end of the contactor switch operating coil 142, the other end of which is connected by the line 204 to the line 120 running from the knife blade contact 52 to the contactor switch fixed contact 126.

One end of the solenoid winding 82 of the protective device 12 is connected by the line 206 to the line 120 just mentioned above, whereas the other end of the winding 82 is connected by the line 208 to the upper fixed contacts 210 and 212 of the thermal overload relays 28 and 30, the remaining upper fixed contacts 214 and 216 of which are connected by the line 218 to the line switch blade contact 58. From the output terminals 166, 168 and 170 run the output lines 220, 222 and 224 respectively leading through the conduit 226 to the electric motor or other equipment controlled by the switching apparatus 10. The conventional thermal overload relays 28 and 30 are provided with hollow casings 228 and 230 containing fusible metal fillings in which are embedded the stems of two upwardly-spring-pressed T-shaped relay switch blades 232 and 234 normally engageable with their lower pairs of fixed contacts 198 and 200 or 192 and 194 respectively but released by the melting of the fusible metal fillings in the casings 228 and 230 to engage the upper pairs of fixed contacts 212 and 216 or 210 and 214 resepectively in response to the flow of overload current through their respective heating coils 162 or 164.

In the operation of the protective device 12, let it be assumed that the operator has swung the handle 74 clockwise to rotate the crankshaft 72 clockwise so as to swing the crank portion 70 and link 68 inward, closing the switch blades 44 to 50 inclusive upon their respective knife contacts 36 to 42 inclusive. Let it also be assumed that the operator has started the motor or other equipment connected to the output lines 220, 222 and 224 by pressing the button of the start push button switch 32, closing the circuit between its contacts 180 and 182. With the blade contacts 52 and 58 inclusive energized from the supply lines 18, 20 and 22 through the closing of the switch blades 44 to 50 inclusive.

Current now flows from the switch blade contact 58 through the line 178, contacts 180 and 182 of the temporarily closed normally open start switch 32, the contacts 186 and 188 of the normally closed stop push button switch 34, the line 190, the contacts 192 and 194 of the thermal overload relay 30, the line 196, contacts 198 and 200 of the thermal overload relay 28, the line 202, the operating coil 142 of the contactor switch 26, the line 204 and the line 120 to the now energized switch blade contacts 52, completing the circuit and energizing the operating coil 142 of the contactor switch 26. This causes the armature 140 and rod 138 thereof to shift to the left against the thrust of the spring 144, closing the contactor switch arms 132, 134, 136 and 146 upon their respective contacts 126, 128, 130 and 148. Even though the operator immediately releases the button of the start switch 32, the circuit thus established is maintained closed through the holding switch blade 146 and its contacts 176 and 148 bridging the now open start switch 32 through the lines 178 and 184.

As a consequence, operating current flows from the blade contacts 52, 54 and 58 through the lines 120, 122 and 124, the contactor switch arms 132, 134 and 136, the lines 156, 158 and 160, the relay operating coils 162 and 164 to the output terminals 168, 166 and 170, energizing the output lines 222, 220 and 224 so as to start the motor or other equipment connected thereto.

Let it be assumed that an overload develops in the motor or other equipment, causing one or the other of the thermal overload relays 28 or 30 to energize its operating coil 162 or 164 sufficiently to melt the fusible metal filling in its casing 228 or 230 and consequently to release its upwardly-spring-pressed T-shaped switch blade 232 or 234, breaking the circuit between its lower contacts 200 and 232 or 194 and 192 and immediately closing the circuit between its pair of upper contacts 216 and 212 or 210 and 214. Normally, the breaking of the circuit between the lower relay contacts 200 and 198 or 194 and 192 re-energizes the operating coil 142 of the contactor switch 26, causing the compression spring 144 to shift the rod 138 to the right, consequently opening the contactor switch arms 132, 134, 136 and 146 away from their respective fixed contacts 126, 128, 130 and 148. This in turn opens the circuit in the lines 120, 122 and 124, consequently de-energizing the output lines 222, 220 and 224 leading to the controlled equipment, even though the line switch 14 remains in its manually closed position shown in Figures 1 and 2.

Let it be assumed, however, that one or more of the contactor switch arm contacts 132, 134, 136 or 146 sticks to the corresponding fixed contacts 126, 128, 130 or 148 thereof, and fails to separate therefrom despite the thrust of the compression spring 144. Normally, this failure of the contactor switch 26 to open would continue the overload and cause the motor or other equipment to burn out or become seriously damaged, notwithstanding the thermal relays 28 and 30 and the contactor switch 26 provided to prevent such an accident. Here, however, the overload protective device 12 of the present invention comes into operation.

The shifting of the armature 228 or 230 of the thermal overload relay 28 or 30 upon breaking the circuit between the lower pair of contacts 200 and 232 or 194 and 192 immediately closes the circuit between one or the other of the pairs of upper relay switch contacts 216 and 212 or 210 and 214, thereby causing current to flow from the line switch blade contact 58 through the line 218, the upper contacts 210 and 214 or 212 and 216 and switch blade 234 or 232 of the thermal overload relay 30 or 28, the line 208, the solenoid winding or operating coil 82, the line 206 and the line 120 to the line switch blade contact 52, completing the circuit.

The consequent energization of the solenoid winding 82 causes the armature 90 and rod 92 of the solenoid 80 to be pulled downward, causing the cross head 102 to move downward by its engagement with the compression spring 100, the opposite end of which is attached to the rod 92. This action tends to straighten out the toggle links 110 and 112, pushing the bracket 62 and cross bar 60 of the line switch 14 upward, forcibly swinging its switch blades 44 to 50 inclusive out of engagement with their knife contacts 36 to 42 inclusive, breaking the circuit between the knife contacts 36 to 42 inclusive and the blade contacts 52 to 58 inclusive, so that current no longer flows from the supply lines 18, 20 and 22 to the lines 120, 122 and 124. As a consequence, the output lines 220, 222 and 224 are de-energized, and the equipment connected thereto is consequently de-energized and halted, regardless of the failure of the contactor switch 26 to operate because of the sticking of one or more of its contacts.

What I claim is:

1. A protective device for electric circuit switching apparatus including a multiple swinging-blade line switch and an overload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in response to the energization of said solenoid winding, toggle link mechanism connected to the swinging-blade assembly of said line switch, and means including a motion-transmitting member connected between said armature and said toggle link mechanism for shifting the links thereof by the reciprocation of said armature.

2. A protective device for electric circuit switching apparatus including a multiple swinging-blade line switch and an overload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in response to the energization of said solenoid winding, toggle link mechanism connected to the swinging-blade assembly of said line switch, and means including a motion-transmitting member connected between said armature and said toggle link mechanism for shifting the links thereof by the reciprocation of said armature, said mechanism including a toggle link connecting said motion-transmitting member to said blade assembly and a second toggle link connecting said motion-transmitting member to a stationary anchorage.

3. A protective device for electric circuit switching apparatus including a multiple swinging-blade line switch and an overload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in response to the energization of said solenoid winding, toggle link mechanism connected to the swinging-blade assembly of said line switch, and means including a motion-transmitting member connected between said armature and said toggle link mechanism for shifting the links thereof by the reciprocation of said armature, said mechanism including a toggle link connecting said motion-transmitting member to said blade assembly and a second toggle link connecting said motion-transmitting member to a stationary anchorage, said links being connected at their inner ends to a cross-head, said means including an element operatively connecting said cross head to said motion-transmitting member.

4. A protective device for electric circuit switching apparatus including a multiple swinging-blade line switch and an overload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in response to the energization of said solenoid winding, toggle link mechanism connected to the swinging-blade assembly of said line switch, means including a motion-transmitting member connected between said armature and said toggle link mechanism for shifting the links thereof by the reciprocation of said armature, said mechanism including a toggle link connecting said motion-transmitting member to said blade assembly and a second toggle link connecting said motion-transmitting member to a stationary anchorage, said links being connected at their inner ends to a cross head, said means including a resilient element operatively connecting said cross head to said motion-transmitting member.

5. A protective device for electric circuit switching apparatus including a multiple swinging-blade line switch and an overload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in response to the energization of said solenoid winding, toggle link mechanism connected to the swinging-blade assembly of said line switch, means including a motion-transmitting member connected between said armature and said toggle link mechanism for shifting the links thereof by the reciprocation of said armature, said mechanism including a toggle link connecting said motion-transmitting member to said blade assembly and a second toggle link connecting said motion-transmitting member to a stationary anchorage, said links being connected at their inner ends to a cross head slidably mounted on said motion-transmitting member, said means including an element operatively connecting said cross head to said motion-transmitting member.

6. A protective device for electric circuit switching apparatus including a multiple swinging-blade line switch and a noverload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in in response to the energization of said solenoid winding, toggle link mechanism connected to the swinging-blade assembly of said line switch, means including a motion-transmitting member connected between said armature and said toggle link mechanism for shifting the links thereof by the reciprocation of said armature, said mechanism including a toggle link connecting said motion-transmitting member to said blade assembly and a second toggle link connecting said motion-transmitting member to a stationary anchorage, said links being connected at their inner ends to a cross head slidably mounted on said motion-transmitting member, said means including a resilient element operatively connecting said cross head to said motion-transmitting member.

7. A protective device for electric circuit switching apparatus including a multiple swinging-blade line switch and an overload contactor switch controlled by a thermal overload relay having separated closed-circuit contacts and open-circuit contacts, said thermal overload relay having a heating coil and a switch blade normally held in engagement with its closed circuit contact under normal load current conditions but urged out of engagement with its closed circuit contacts and into engagement with its open circuit contacts in response to the flow of overload current through its heating coil, said protective device comprising a solenoid having a winding connected in series with a circuit running from one line switch blade through the open-circuit contact and switch blade of the thermal overload relay to another line switch blade energized in response to the opening of said overload relay as a result of an overload in the output circuit of said switching apparatus, said solenoid having an armature reciprocated in response to the energization of said solenoid winding, toggle link mechanism connected to the swinging-blade assembly of said line switch, means including a motion-transmitting member connected between said armature and said toggle link mechanism for shifting the links thereof by the reciprocation of said armature, said mechanism including a toggle link connecting said motion-transmitting member to said blade assembly and a second toggle link connecting said motion-transmitting member to a stationary anchorage, said links being connected at their inner ends to a cross head slidably mounted on said motion-transmitting member, said means including a spring secured at one end to said motion-transmitting member and having its other end yieldably engaging said cross head and operatively connecting said cross head to said motion-transmitting member.

References Cited in the file of this patent

UNITED STATES PATENTS

| | | |
|---|---|---|
| 1,154,733 | Simon | Sept. 28, 1915 |
| 1,169,723 | Joleen | Jan. 25, 1916 |
| 1,288,820 | Braunwarth | Dec. 24, 1918 |
| 1,580,025 | Eaton | Apr. 6, 1926 |
| 1,643,415 | Moore | Sept. 27, 1927 |
| 1,680,495 | Barnum et al. | Aug. 14, 1928 |
| 2,261,632 | Rosing et al. | Nov. 4, 1941 |

FOREIGN PATENTS

| | | |
|---|---|---|
| 559,546 | Germany | Sept. 22, 1932 |